United States Patent [19]

Dodds et al.

[11] Patent Number: 4,473,634
[45] Date of Patent: Sep. 25, 1984

[54] COATED PHOSPHORS, METHOD FOR PRODUCING SAME AND ARTICLES EMPLOYING SAME

[75] Inventors: Robert E. Dodds; Carl E. Landmesser, both of Towanda; Henry B. Minnier, Dushore; Harry O. Schulze, Wyalusing, all of Pa.

[73] Assignee: GTE Products Corporation, Stamford, Conn.

[21] Appl. No.: 348,466

[22] Filed: Feb. 12, 1982

Related U.S. Application Data

[63] Continuation of Ser. No. 970,701, Dec. 18, 1978, abandoned.

[51] Int. Cl.³ .............................................. B05D 5/06
[52] U.S. Cl. ..................... 430/272; 427/64; 427/68; 428/404; 313/466; 430/271; 430/28
[58] Field of Search ................... 427/64, 68, 218, 219; 428/404; 313/466; 430/271, 28, 272

[56] References Cited

U.S. PATENT DOCUMENTS 3,544,354 12/1970 Kachel ............................ 427/64
4,020,231 4/1977 Hedler ............................ 428/403
4,128,674 12/1978 Hedler ............................ 427/217
4,287,229 9/1982 Watanabe ....................... 427/64

Primary Examiner—Sam Silverberg
Attorney, Agent, or Firm—James Theodosopoulos

[57] ABSTRACT

The red and blue color cathode ray tube phosphors for color television are pigmented with a coating of an aqueous-insoluble silicate-based glass matrix containing pigment particles. When incorporated into a tridot color cathode ray tube, the contrast of the tube is improved. The coated particles are formed by dispersing the particles in a slurry with a silicate, the pigment particles and an optional wetting agent, and evaporating the slurry to dryness. The dried coated particles are then heated in order to insolubilize the glass matrix, and soluble ions are then removed by washing.

9 Claims, 2 Drawing Figures

COATED PHOSPHORS, METHOD FOR PRODUCING SAME AND ARTICLES EMPLOYING SAME

This is a continuation of application Ser. No. 970,701 filed Dec. 18, 1978, now abandoned.

TECHNICAL FIELD

This invention relates to coated phosphors, specifically to a phosphor coated with light modifying particles in an aqueous-insoluble silicate glass, and to a method for producing such coated phosphors, and also to articles of manufacture employing the coated phosphors.

BACKGROUND ART

It is well known in the art of color cathode ray phosphors to modify the absorptive, reflective and/or emissive characteristics of the phosphors by coating the surfaces of individual phosphor particles with a pigment, filter or other material. In U.S. Pat. No. 3,875,449, issued Apr. 1, 1975, phosphor particles are surrounded by a continuous coating of such a material, and the coated particles are then encapsulated in a protective resin coating, for example, polyvinyl alcohol. In U.S. Pat. No. 3,886,394, issued May 27, 1975, phosphor particles are covered with a filter material adhered to the surface of the particles by a gelatin layer, for example, polyvinyl pyrrolidone. The filter particles are thus embedded or dispersed in the adherent gelatin layer. In U.S. Pat. Nos. 4,020,231, and 4,128,674, issued Apr. 26, 1977, and Dec. 5, 1978, respectively, and assigned to the present assignee, a light modifying layer is formed on the phosphor by coprecipitation of of silica and pigment particles. In U.S. Pat. No. 4,021,588, issued May 3, 1977, a filter material is precipitated directly onto the phosphor particles, and the particles are then sintered to adhere filter particles to the surfaces thereof. Finally, in U.S. Pat. No. 4,049,845, issued Sept. 20, 1977, filter particles are adhered to the surfaces of phosphor particles by means of coagulating colloidal particles of latex from a suspension surrounding the particles therein.

With the exceptions of U.S. Pat. Nos. 4,020,231 and 4,021,588, the above patents all describe organic-based coating systems. The major disadvantage of these systems is that the phosphor particles must retain their organic coating in order to retain the light modifying particles. Thus, the strong oxidizing agents and/or heat normally encountered during phosphor reclaim operations (in which a phosphor is reclaimed from the faceplate of a cathode ray tube) must be avoided. This requirement essentially renders such reclaim operations impractical, since organic-based systems are also used to adhere the coated phosphor particles to the faceplate. In practice then, pigment or other light modifying particles are removed during the reclaim operation and the reclaimed phosphor particles are then recoated prior to being redeposited on a faceplate.

Another disadvantage of organic-based coatings is that they tend to render coated particles unwettable by water-based slurry systems used to form cathode ray tube screens. Such poor wettability leads to poor dispersion of the phosphor particles and consequent poor screen quality.

Other coating techniques which avoid the use of organic materials have proved unsatisfactory for other reasons. For example, the coprecipitated coating of U.S. Pat. Nos. 4,020,231 and 4,128,674 tend to have poor adherence when subjected to the handling associated with screening operations. The sintered coating of U.S. Pat. No. 4,021,588, while exhibiting good adherence, requires relatively high temperatures (at least about 800° C.) for its formation.

DISCLOSURE OF THE INVENTION

In accordance with the invention, a light modifying coating for a phosphor particle is provided which is inorganic, exhibits good adherence, and can be formed at intermediate temperatures, e.g., about 150° C. to 550° C. The coating comprises an ammonium or alkali metal (Li, Na or K) silicate-based glass support matrix and particles of a light modifying material, such as a pigment or filter material, distributed in the matrix. Phosphors so coated are thus compatible with existing screening operations, and can be subjected to the usual reclaim operations without removal of the coating from the phosphor particle surface.

In accordance with another aspect of the invention, coated phosphor particles are provided by: contacting the phosphor particles with an ammonium or alkali metal silicate and particles of the light modifying material; and heating the contacted particles at about 150° C. to 550° C. for a time of at least about 1 hour in order to form an aqueous insoluble silicate-based glass matrix containing the light modifying particles; and washing the coated particles to remove any soluble ions.

In accordance with another aspect of the invention, an article of manufacture is provided including dots of a photosensitive matrix material supporting coated phosphor particles, such dots disposed in a desired array or pattern upon a substrate such as a cathode ray tube faceplate.

In accordance with a preferred embodiment, the article is a color cathode ray tube screen containing elemented areas of red, blue and green phosphors, such as dots or strips, arranged in a predetermined pattern or array. The red phosphor is europium activated yttrium oxide, europium activated yttrium oxysulfide or europium activated yttrium orthovanadate pigmented with about 0.1 to 0.5 weight percent of an inorganic red pigment such as red iron oxide; the blue phosphor is silver activated zinc sulfide pigmented with about 1 to 3 weight percent of an inorganic blue pigment such as cobalt aluminate; and the green phosphor is copper and aluminum activated zinc cadmium; sulfide, copper and aluminum activated zinc sulfide processed as described and claimed in U.S. Pat. No. 4,038,205, issued July 26, 1977 and assigned to the present assignee.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
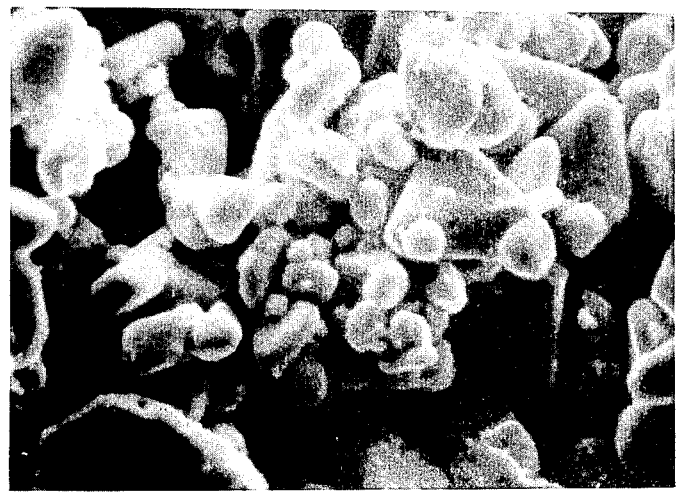
FIG. 1 is a photomicrograph of phosphor particles having surfaces coated by the silicate glass based coating of the invention.

Referring to FIG. 1, the phosphor particle may be any phosphor material suitable for use in cathode ray tube applications, that is any phosphor which upon excitation by cathode rays emits radiation of a wavelength suitable for the envisioned application. It is of course contemplated, in accordance with a preferred embodiment of the invention, that the phosphor particles be chosen from the standard red, blue and green phosphors known to be suitable in the fabrication of color cathode ray tube screens for color televsion.

In accordance with the invention, a method is provided for coating the phosphor particles wherein the particles are contacted with an ammonium or alkali metal silicate and particles of the light modifying material, and the contacted particles are heated at a temperature of from about 150° C. to 550° C., preferably 450° C. to 550° C. for a short period of time, for example about 1 to 2 hrs, in order to convert the coating to an aqueous-insoluble silicate-based glass coating having good adherent properties.

It will of course be appreciated that the light modifying particles must be of a substantially smaller average diameter than that of the phosphor particles to be coated, at least 10 times smaller. In the case of pigment particles for the red and blue phosphor components of a cathode ray tube for color television, the average diameter of the phosphor particles range in size from about 4 to 9 microns while the pigment particles are sub micron in size. When coated upon the phosphor particles in the amount of about 0.1 to 0.5 weight percent for the red phosphor and about 1 to 3 weight weight percent of the blue phosphor, these pigment particles tend to result in increased contrast of a color cathode ray tube for color television.

Preferably, the phosphor particles are contacted with the light modifying particles and silicate by slurrying in aqueous solution $A_2O.x\ SiO_2$ where x is between 2 and 8, with an optional wetting agent. Agitation of the solution to keep the particles in suspension, while heating at a moderately elevated temperature, for example 70° C. to 120° C., until substantially complete evaporation of the water has taken place, allows the silicate and light modifying particles to coat the surfaces of the phosphor particles. The dried particles are then heated and washed as described above.

In order to promote the wetting and dispersion of both the phosphor and pigment particles in the slurry, an optional wetting agent may be added in the amount of about 0.1% by volume. Suitable wetting agents are selected from a wide variety of well-known and readily available commercial materials, in general divided into three categories; cationic, (e.g., organo sulfates and phosphates), nonionic, (e.g., polyglysols, and ethylene oxide derivatives such as alkylaryl polyether alcohol) and anionic (e.g., organic amines, and acid phosphate esters). A wetting agent of the dispersion type used herein is TAMOL 731, a sodium salt of a carboxylate polyelectrolyte manufactured by Rohm and Haas.

The silicate and light modifying particles are preferably present in the slurry in the amount of about 0.5 to 1% $SiO_2$ and 0.1 to 3.0 weight percent, respectively, of the phosphor particles.

Figure 2:
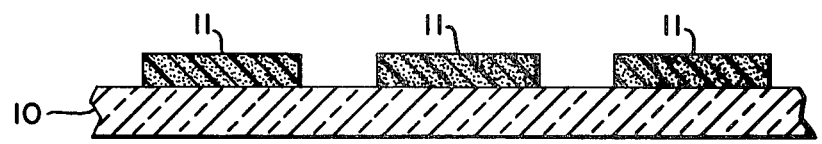
FIG. 2 is a section view of a cathode ray tube faceplate 10 supporting a plurality of stripes 11, each stripe comprising a plurality of the coated phosphor particles of FIG. 1 supported in a photosensitive matrix.

Referring now to FIG. 2, there is shown an article of manufacture including an array of a plurality of stripes of a photosensitive matrix material, such as dichromated polyvinyl alcohol photoresist, supporting coated phosphor particles, the stripes supported by a screen substrate such as a cathode ray tube faceplate. Such stripes are preferably formed by exposing an integral photoresist layer selectively with a pattern of light corresponding to the pattern of stripes desired to be formed on the faceplate. Subsequently, a developer removes the unexposed portions of the photoresist including the phosphor particles supported therein, and leaves the stripes which had been insolublized to the developer by the light exposure.

EXAMPLE I

The following ingredients were charged to a steam kettle and evaporated to dryness during constant agitation at about 120° C.

50 pounds of zinc sulfide:silver blue phosphor; 1.25 pounds of cobalt aluminate blue pigment, 1.25 pounds of sodium silicate ($Na_2O.SiO_2$); 10 milliliters of TAMOL 731 wetting agent and 20 gallons of deionized water.

The dried powder was then transferred to quartz containers, covered, and baked for about 2 hours at about 450° C. The resulting pigmented phosphor was water washed, filtered, and dried. Water washing resulted in minimal loss of blue pigment.

EXAMPLE II

The procedure of Example I was repeated except that the sodium silicate was replaced by 1500 milliliters of potassium silicate. Water washing again indicated minimal loss of pigment. (See Table III)

EXAMPLE III

The procedure of Example I was repeated using 5 kilograms of the blue phosphor, 100 grams of cobalt aluminate pigment, 275 milliliters of a 30 percent total solide solution of potassium silicate ($K_2O.3.3\ SiO_2$), 2 milliliters of TAMOL 731 wetting agent and 2,000 milliliters of deionized water. Washing with both water and polyvinyl alcohol indicated minimal loss of pigment.

EXAMPLE IV

The procedure of Example I was followed using 3 kilograms of a red yttrium vanadate:europium phosphor, 15 grams red iron oxide pigment, 100 milliliters of a 30% total solids potassium silicate solution ($K_2O.3.3\ SiO_2$), 1 milliliter of TAMOL 731 wetting agent and 1500 milliliters of deionized water. Again, water washing indicated minimal loss of pigment. (See Table I).

EXAMPLE V

The procedure of Example I was repeated using 4 kilograms of red yttrium oxide: europium phosphor, 20 grams of red iron oxide pigment, 225 milliliters potassium silicate, 2 milliliters TAMOL 731 wetting agent and 1500 milliliters of deionized water. Washing indicated minimal loss of pigment using water and polyvinyl alcohol. (See Table I).

EXAMPLE VI

Using the pigmented red phosphors prepared as in Examples IV (Sample No. 1) and V (Sample No. 2) above, color television cathode ray tube screens were prepared by the dusting technique. (See U.S. Pat. No. 3,025,161, issued Mar. 13, 1962, and assigned to the present assignee.) The amount of pigment (as weight percent of the phosphor) was measured before and after dusting. Results are shown below in Table I. The last column of each Table reports the percent of pigment retained on the phosphors after dusting.

TABLE I

| Sample No. | Before Washing | Before Dusting | After Dusting | Percent Retained |
|---|---|---|---|---|
| (EX. IV) 1 | 0.34 | 0.34 | 0.31 | 91 |
| (EX. V) 2 | 0.44 | 0.43 | 0.40 | 91 |

For comparison a red $Y_2O_3$:Eu phosphor pigmented using a latex binder was tested as above. The procedure for preparation was as follows: Six kilograms of red phosphor are slurried in sufficient water at 30° C. to result in a solids content of about 2 to 3 pounds per gallon. Thirty grams of $Fe_2O_3$ red pigment are then dispersed in two liters of water with a commercial non-ionic surfactant (e.g., 2 ml of a 1 percent Triton X-405, manufactured by Rohm and Haas). The dispersion is then added to the slurry and agitated. Next, 2 liters of a 0.15 weight percent water soluble latex solution is added, and with agitation the pH is adjusted to about 3 to 3.5 with $H_2SO_4$. Agitation is continued about 15 minutes to allow the latex to gel and to coat the particles. The liquid is then decanted and the coated particles washed. Results are shown in Table II.

TABLE II

| Sample No. | Before Washing | Before Dusting | After Dusting | Percent Retained |
|---|---|---|---|---|
| 4 | 0.50 | .48 | .25 | 50 |
| 5 | 0.95 | .82 | .36 | 38 |
| 6 | 0.57 | .53 | .25 | 44 |

Finally, the pigmented blue phosphor prepared as in Example III was tested using various amounts of pigment. Results are shown in Table III.

TABLE III

| Sample No. | Before Washing | Before Dusting | After Dusting | Percent Retained |
|---|---|---|---|---|
| (EX. III) 7 | 1.60 | 1.60 | 1.60 | 100 |
| 8 | 1.56 | 1.54 | 1.50 | 97 |
| 9 | 1.14 | 1.10 | 1.09 | 99 |
| 10 | 0.86 | 0.82 | 0.82 | 100 |

While there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

The invention is useful in the modification of the light properties of various phosphors, particularly cathode ray phosphors, and is particularly applicable in the modification of color cathode ray tube phosphors for color television by the addition of red pigment to the red phosphor and blue pigment to the blue phosphor of such color television tubes.

We claim:

1. A composite article of manufacture comprising a phosphor particle and a coating on the surface of the particle, said coating including particles of a light modifying material, characterized in that said light modifying particles are supported by a matrix of a continuous aqueous-insoluble silicate-based glass selected from the group consisting of alkali metal silicate-based glass and ammonium silicate-based glass wherein said coating is formed by suspending the phosphor particles in a aqueous silicate solution, heating the suspension until substantial complete evaporation of the water thereby coating the phosphor particles, and then heating the coated phosphor particles to form a glass coating.

2. The article of claim 1 wherein the light modifying particles are inorganic pigment particles.

3. The article of claim 1 wherein the silicate glass is a potassium silicate-based glass.

4. The article of claim 1 wherein the phosphor particle is a cathode ray phosphor.

5. The article of claim 4 wherein the phosphor particle is selected from the group consisting of red, blue and green emitting color cathode ray tube phosphors.

6. An article of manufacture comprising a cathode ray tube faceplate and an array of elemental areas on the cathode ray tube faceplate, the areas comprising coated particles of a cathode ray phosphor distributed in a matrix of a photoresist, the particle coating containing particles of a light modifying material, characterized in that the light modifying particles are supported by a matrix of a continuous aqueous-insoluble silicate-based glass selected from the group consisting of alkali metal silicate-based glass and ammonium silicate-based glass wherein said coating is formed by suspending the phosphor particles in a aqueous silicate solution, heating the suspension until substantial complete evaporation of the water thereby coating the phosphor particles, and then heating the coated phosphor particles to form a glass coating.

7. The article of claim 6 wherein the light modifying particles are inorganic pigment particles.

8. The article of claim 6 wherein the silicate-based glass is a potassium silicate-based glass.

9. The article of claim 6 wherein the cathode ray phosphor particle is selected from the group of red, blue and green emitting color cathode ray tube phosphors.

* * * * *